United States Patent
Baltieri (10) Patent No.: US 11,373,382 B2
(45) Date of Patent: Jun. 28, 2022

(54) AUGMENTED REALITY IMPLEMENTATION METHOD

(71) Applicant: PIKKART S.R.L., Modena (IT)

(72) Inventor: Davide Baltieri, Modena (IT)

(73) Assignee: PIKKART S.R.L., Modena (IT)

( * ) Notice: Subject to any disclaimer, the term of this patent is extended or adjusted under 35 U.S.C. 154(b) by 0 days.

(21) Appl. No.: 17/601,944

(22) PCT Filed: Apr. 1, 2020

(86) PCT No.: PCT/IB2020/053076
§ 371 (c)(1),
(2) Date: Oct. 7, 2021

(87) PCT Pub. No.: WO2020/212794
PCT Pub. Date: Oct. 22, 2020

(65) Prior Publication Data
US 2022/0092864 A1    Mar. 24, 2022

(30) Foreign Application Priority Data

Apr. 15, 2019 (IT) .................... 102019000005806

(51) Int. Cl.
  *G06T 19/00* (2011.01)
  *G06T 7/73* (2017.01)
  *G06T 7/35* (2017.01)

(52) U.S. Cl.
  CPC .............. *G06T 19/006* (2013.01); *G06T 7/35* (2017.01); *G06T 7/75* (2017.01); *G06T 2207/10016* (2013.01); *G06T 2207/20076* (2013.01)

(58) Field of Classification Search
  CPC .... G06T 7/70; G06T 7/73; G06T 7/74; G06T 7/75; G06T 7/30; G06T 7/33;
  (Continued)

(56) References Cited

U.S. PATENT DOCUMENTS

2015/0187133 A1* 7/2015 Martini ............... A63F 13/5378
                                                              345/420
2016/0335523 A1   11/2016 Piotto
2018/0165879 A1*  6/2018 Holzer ....................... G06T 7/20

OTHER PUBLICATIONS

Cao M, Jia W, Li S, Li Y, Zheng L, Liu X. GPU-accelerated feature tracking for 3D reconstruction. Optics & Laser Technology. Feb. 1, 2019;110:165-75. (Year: 2019).*

(Continued)

*Primary Examiner* — Diane M Wills
(74) *Attorney, Agent, or Firm* — Dickinson Wright PLLC; Andrew D. Dorisio (57) ABSTRACT

A method is described for implementing augmented reality by means of transferring annotations from a model image to a video flow or to a sequence of destination images. The method entails the creation of a model image for each point of interest (or several points of interest), in addition to the annotation of said model image with point annotations on the objects points of interest that are intended to be augmented and made user-interactable. The method will automatically try to understand if the video flow or the sequence of destination images contains the object contained in the model image and, if so, it will automatically transfer the annotations made from the model image to the video flow or to the sequence of destination images, maintaining the location of the points relative to the object.

6 Claims, 6 Drawing Sheets

(58) Field of Classification Search
CPC .. G06T 7/337; G06T 7/35; G06T 7/38; G06T 19/006; G06T 2207/10016; G06T 2207/20076
See application file for complete search history.

(56) References Cited

OTHER PUBLICATIONS

David G. Lowe; "Distinctive Image Features from Scale-Invariant Keypoints"; International Journal of Computer Vision; vol. 60, No. 2; Jan. 5, 2004.

* cited by examiner

AUGMENTED REALITY IMPLEMENTATION METHOD

Technical Field.

The present invention concerns in general a method for implementing augmented reality and, in particular, a method for implementing augmented reality by means of transfer of annotations from a model image to a video flow or to a sequence of destination images.

Background.

As is known, by augmented reality, or computer-mediated reality, we mean the enrichment of human sensory perception by means of information, generally handled and conveyed electronically, that would not be perceivable with the five senses. Augmented reality allows, for example, one or more virtual objects to be included in the images of a sequence of images or within a video flow, for commercial purposes, in order to control the images, for maintenance, technical support, or other.

In the jargon of augmented reality, a physical object is also called a marker: this term indicates any three-dimensional object or a sufficiently detailed flat image to be identified and tracked. Generally, this marker is identified and tracked through spatial identification of the marker in relation to some elements of the image. Having determined the position and spatial orientation of the marker, it is possible to track its movement according to the movement of the image capturing means (camera, video camera or similar) or according to the movement of the marker in the scene represented in the image. For a description of some techniques of known type, see, for example:

Daniel Wagner, Gerhard Reitmayr, Alessandro Mulloni, Tom Drummond, Dieter Schmalstieg, "*Real-time detection and tracking for augmented reality on mobile phones*", IEEE Transactions on Visualization and Computer Graphics (volume 16, issue 3, May-June 2010);

Mafkereseb Kassahun Bekele, Roberto Pierdicca, Emanuele Frontoni, Eva Savina Malinverni, James Gain, "*A survey of augmented, virtual, and mixed reality for cultural heritage*", Journal on Computing and Cultural Heritage (volume 11, issue 2, June 2018).

In implementing augmented reality on complex objects (for example statues or industrial machinery) one of the main problems encountered in use of the techniques of a known type, which entail the effective modelling of a detection model (usually created by means of three-dimensional scanning of the object), is creation of the model (or marker) itself. This model often requires the use of relatively costly machinery, or complex (and therefore also costly) procedures, which it may not be possible to implement. Often, for example, it is not possible to reconstruct the object to be recognised simply because the object cannot be moved and it is not possible to position the three-dimensional scanning instruments around it.

Summary.

The object of the present invention is therefore to obtain a method for implementing augmented reality, in particular a method for implementing augmented reality by means of transferring annotations from a model image to a video flow or to a sequence of destination images, which is able to solve the above-mentioned drawbacks of the prior art in an extremely simple, inexpensive and particularly functional manner.

In detail, an object of the present invention is to obtain a method for implementing augmented reality which is easy to use not only for possible end users, but also for content creators. According to this method, the problem of augmented reality on three-dimensional objects is tackled in a totally alternative way, namely by means of "annotation transfer". With the method according to the present invention it is no longer necessary to create a complex detection model, by means of 3D scanning or CAD reconstructions; the method is based simply on one or more (in general very few) photographs, without any three-dimensional reconstruction of the object to be recognised.

This and other objects according to the present invention are achieved by producing a method for implementing augmented reality, in particular a method for implementing augmented reality by transferring annotations from a model image to a video flow or to a sequence of destination images, as described in claim 1.

Further features of the invention are highlighted by the dependent claims, which form an integral part of the present description.

Based on the method for implementing augmented reality according to the present invention, it is sufficient to take a photograph for each point of interest (or several points of interest) and annotate it with point annotations on the object's points of interest that are intended to be augmented and made user-interactable. The method will automatically try to understand if the video flow or the sequence of destination images contains the object contained in the photograph and, if so, it will automatically transfer the annotations made from the original image to the destination, maintaining the location of the points relative to the object. For example, if a point of interest has been annotated on the right-hand side of a statue, this point of interest will appear on the right-hand side of the statue, in the same position in which it was located on the model image.

The method uses three separate modules: a model detector, a PoI (Point of Interest) detector and a PoI tracker, which tracks the position of the PoI in a sequence of images or in a video flow. The input datum of the method is a detection model processed from one or more images of the real object, with relative annotations (PoI) on said one or more images.

BRIEF DESCRIPTION OF THE DRAWINGS

The features and the advantages of a method for implementing augmented reality according to the present invention will become clearer from the following illustrative non-limiting description, referring to the attached schematic drawings in which.

DETAILED DESCRIPTION

With reference to the figures, a preferred embodiment is shown of the method for implementing augmented reality according to the present invention. The method entails an initial step of creating a detection model starting from at least one model image on which at least one point of interest (PoI) is represented. The step of creating a detection model comprises a sub-step in which, for each model image, two further copies of the same model image are generated with different scales. For example, a smaller model image is generated, with scale $$\frac{1}{\sqrt{2}},$$

and a larger model image, with scale $\sqrt{2}$.

From each model image a first predefined group of keypoints (P1, Pn) is extracted, with n equal for example to 1000, by means of a standard algorithm already known, as for example those described in:

"algorithm 1": Edward Rosten, Tom Drummond, "*Machine learning for high-speed corner detection*", European Conference on Computer Vision (volume part I, pages 430-443, May 2006);

"algorithm 2": Jianbo Shi, Carlo Tomasi, "*Good features to track*", IEEE Conference on Computer Vision and Pattern Recognition (pages 593-600, January 1994).

A method and an apparatus according to the known technique for identifying incorrect associations between the keypoints of a first image and the keypoints of a second image is described, for example, in the document US 2016/0335523 A1.

In the method according to the present invention, starting from the first predefined group of keypoints extracted, a second predefined group will be maintained. This second predefined group of keypoints is more limited than the first predefined group of keypoints and is able to survive a first cleaning phase. In this first cleaning phase, the model image undergoes various perspective transformations and only those keypoints that are detected, again by the same algorithm as above, in the same position survive.

Again according to an algorithm of a known type (such as, for example, the one described in Alexandre Alahi, Raphael Ortiz, Pierre Vandergheynst, "*FREAK: fast retina keypoint*", IEEE Conference on Computer Vision and Pattern Recognition, 2012 and mentioned here as "algorithm 3") for each of the keypoints survived, a descriptor is calculated. The descriptor is an alphanumerical vector that summarises the visual characteristics of each keypoint. Consequently, the distance between descriptors measures the visual similarity between respective keypoints. The keypoints then undergo a second cleaning phase, in which the model image again undergoes various perspective transformations and only those keypoints survive for which the nearest keypoint, in terms of distances measured by means of descriptors, is itself perspectively transformed and vice versa. Each keypoint that survives this second cleaning phase is associated with a discriminativity value, which measures the uniqueness of the keypoint descriptor within the entire group of models to be recognised.

Figure 1:
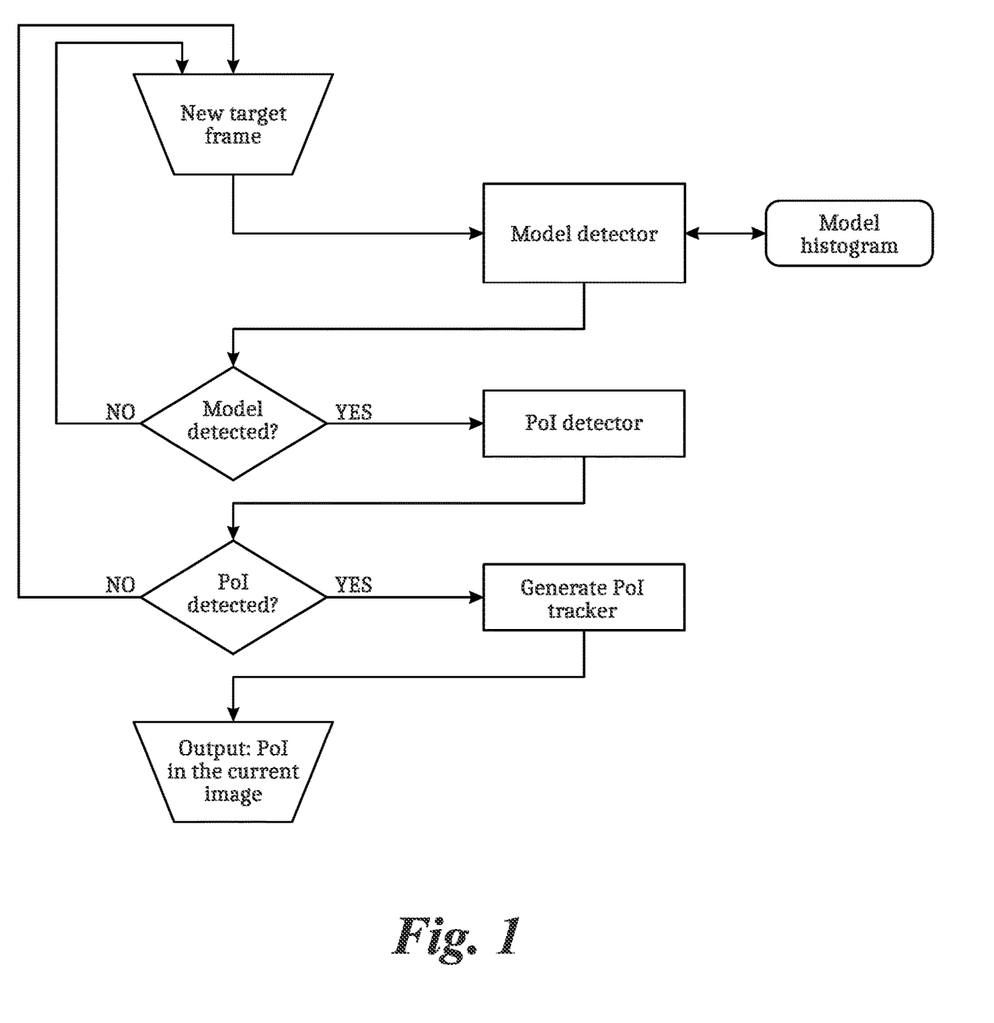
FIG. 1 is a block diagram which shows the sequential execution steps of the method for implementing augmented reality according to the present invention.
Figure 2:
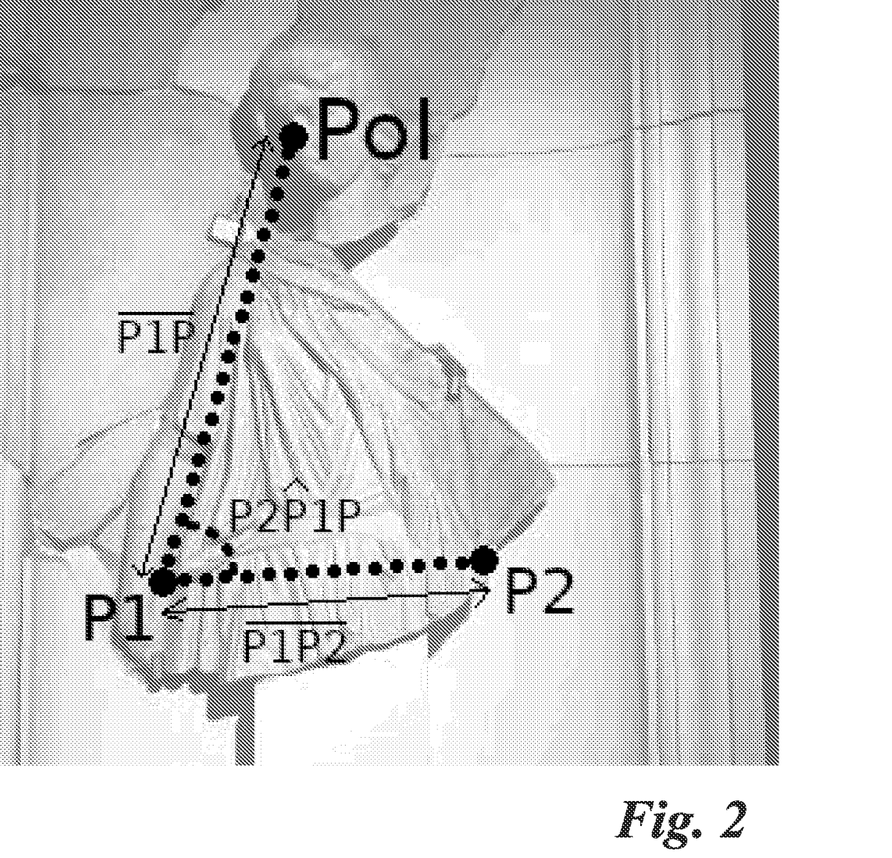
FIG. 2 shows an example of identification of a point of interest (PoI) in a real case.
Figure 3:
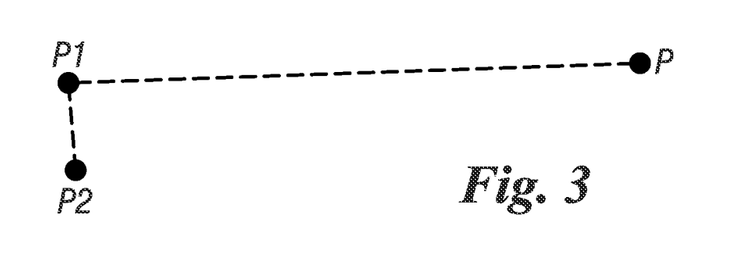
FIG. 3 shows an example in which the identification of a point of interest (PoI) is carried out in an invalid manner.
Figure 4:
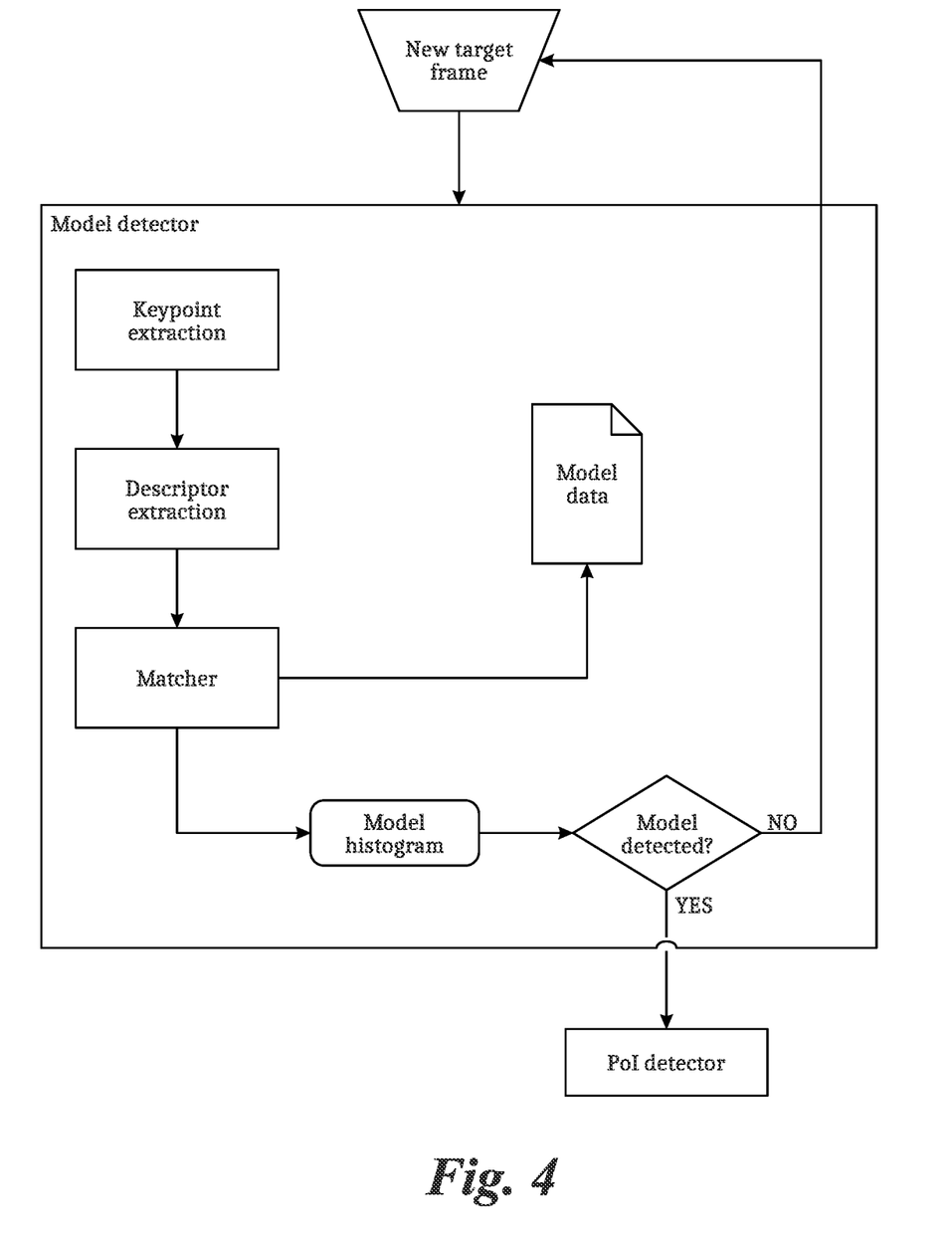
FIG. 4 is a block diagram that shows operation of the model detector.

At this point the heart of the detection model is created: for each point of interest (PoI) a predefined subgroup of keypoints (P1, Pk) adjacent in spatial terms is selected, with k equal for example to 100, then all the pairs (P1, P2, see FIG. 2) of these keypoints are selected such that given spatial relationships are valid, namely:

the distance (P1-P2) between a first keypoint (P1) and a second keypoint (P2) exceeds a first minimum threshold, and the ratio between the distance (P1-PoI) between a first keypoint (P1) and the point of interest (PoI) and the distance (P1-P2) between a first keypoint (P1) and a second keypoint (P2) is lower than a second minimum threshold.

Therefore, for each pair (P1, P2) of keypoints the value of the angle (P2, P1, PoI) is calculated, measured at the vertex formed by the first keypoint (P1), between the segment that joins the second keypoint (P2) and the first keypoint (P1) and the segment that joins the point of interest (PoI) and the first keypoint (P1). The value of the angle (P2, P1, PoI), and the ratio between the distance (P1-PoI) between a first keypoint (P1) and the point of interest (PoI) and the distance (P1-P2) between a first keypoint (P1) and a second keypoint (P2), are then stored. In general, at the end of the procedure approximately 4000 pairs of keypoints survive.

Using the model detector, for each new destination image, where by image we mean also a single frame of a destination video flow, a predefined group of keypoints is extracted by means of one of the standard algorithms already known and previously mentioned (such as, for example, the algorithm 1). Again, using a calculation algorithm of a descriptor like the one mentioned previously (such as, for example, the algorithm 3), a descriptor is calculated for each of the keypoints extracted.

Using a further algorithm of a known type (such as, for example, the one described in Marius Muja, David G. Lowe, "*Scalable nearest neighbour algorithms for high dimensional data*", IEEE Transactions on Pattern Analysis and Machine Intelligence (volume 36, issue 11, November 2014) and mentioned here as "algorithm 4"), for each keypoint of the current destination image (or frame) the nearest keypoint is calculated from the keypoints of each detection model to be searched for.

The value of the distance, measured on the basis of the descriptors, between each keypoint of the current destination image (or frame) and the nearest keypoint of the detection model is then multiplied by the discriminativity value of the keypoint (calculated in a previous step of the method). This multiplied value of the distance is accumulated in a histogram of votes (each bin of the histogram represents a model/view). The histograms of several consecutive destination images (or frames) are aggregated with an exponential moving average:

(viewHistoAgg($i,t$)=viewHisto($i,t$)*alpha+viewHistoAgg($i,t$-1)*(1-alpha)).

If the ratio between the first view most voted and the second view most voted exceeds a certain threshold (ratio test), said first view is considered the "winner" and the respective detection model is considered as identified in the current destination image (or frame).

Using a PoI (point of interest) detector, once a specific model image of the detection model has been identified, the aim is to transfer the annotation of said model image, namely the respective PoI, to the subsequent current frames. Using the same known extraction algorithm (such as, for example, the algorithm 1), a certain number of keypoints are extracted and, again using the same known calculation algorithm of the descriptor (such as, for example, the algorithm 3), for each of these keypoints extracted a descriptor is calculated. Using once again a known algorithm (such as, for example, the algorithm 4) or a brute force method, for each keypoint of the current frame the one most similar in the detection model is searched for. It may be appropriate to clean these matches using various techniques, including keypoint orientation variation consistency (all the keypoints that belong to a solid object, if the object is physically rotated by a few degrees, must also be rotated by a few degrees) and other known techniques.

Figure 5:
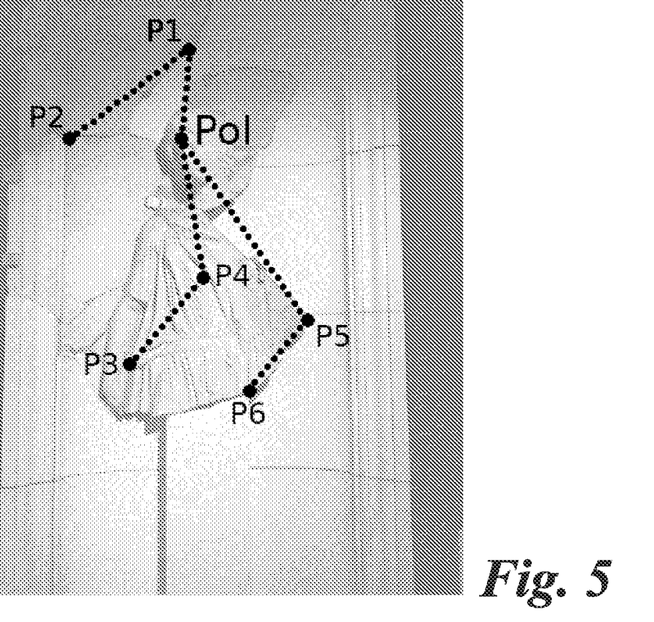
FIG. 5 shows a model image example.
Figure 6:
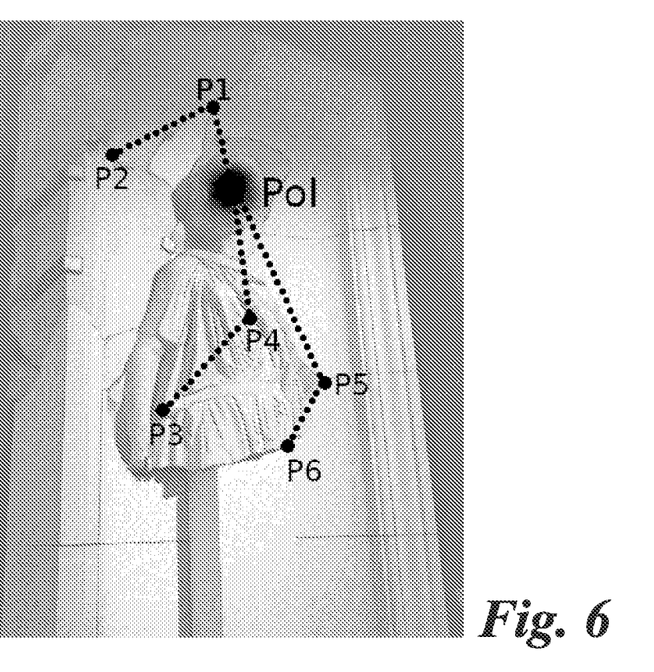
FIG. 6 shows a point of interest (PoI) identified on the current image.
Figure 7:
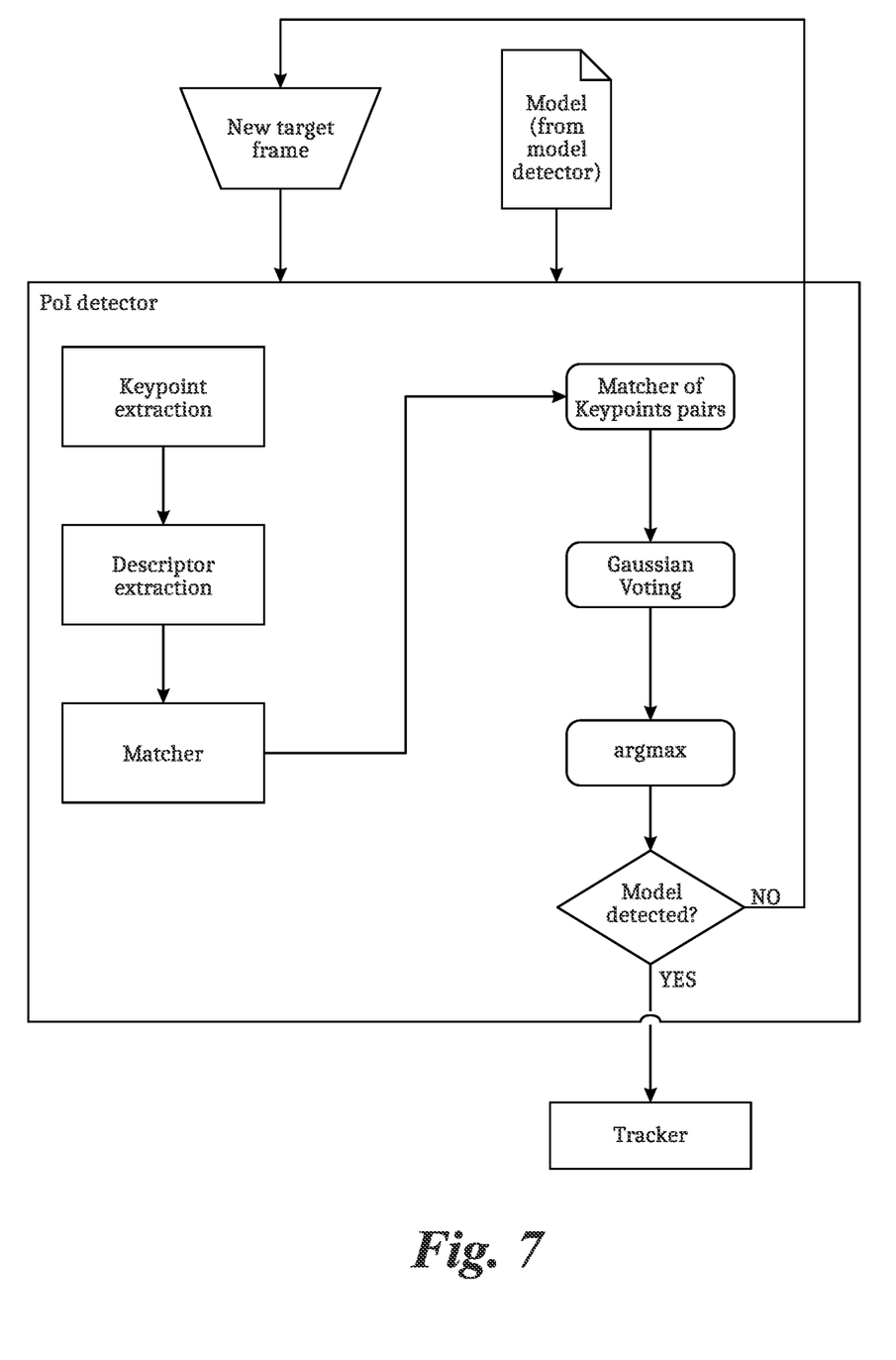
FIG. 7 is a block diagram that shows operation of the point of interest (PoI) detector.

Therefore, for each pair of keypoints (P1', P2') in the current frame, which corresponds to a pair of similar keypoints (P1, P2) in the detection model, a continuous probability distribution (normal or Gaussian distribution) is performed to identify the position of the PoI of the detection model on the current frame by means of the values of the angle (P2, P1, PoI) and the ratio between the distance (P1-PoI) between the first keypoint (P1) and the point of interest (PoI) and the distance (P1-P2) between the first keypoint (P1) and the second keypoint (P2), as stored in the detection model (FIGS. 5 and 6). Furthermore the ratio between the distance (P1'-P2') of each pair of keypoints (P1', P2') of the current frame and the distance (P1-P2) of the corresponding pair of keypoints (P1, P2) of the detection model provides an estimate of the magnitude of the PoI once the measurements of all the pairs of keypoints identified in the current frame have been appropriately aggregated.

Each pair of keypoints (P1, P2) of the detection model "votes", in probabilistic terms, a possible position $P(M_k vx)$ of the PoI. Each pair $M_K$ votes by means of a Gaussian distribution centred in a point $X_k$, calculated starting from the angle (P2, P1, PoI) and the ratio between the distance (P1-PoI) stored in the model. The objective is to identify the actual position of the PoI as argmax of the combination of the probability distributions:

$$\operatorname*{argmax}_{x} P(x \mid M) = \operatorname*{argmax}_{x} \frac{P(M \mid x)P(x)}{P(M)}$$
$$= \operatorname*{argmax}_{x} \frac{\prod P(M_k \mid x)P(x)}{P(M)}$$
$$\approx \operatorname*{argmax}_{x} \prod P(M_k \mid x)$$
$$\approx \operatorname*{argmax}_{x} \prod N(X_k, \sigma)$$

where each single probability distribution is represented by a Gaussian distribution centred in the point $X_k$ identified by means of the values of the angle (P2, P1, PoI), the ratio between the distance (P1-PoI) and variance σ.

Once the actual position of the PoI in the current image or frame has been identified, a PoI tracker is started which tracks the position in the subsequent frames. For each PoI a specific tracker is started, implemented according to an algorithm of a known type (such as, for example, the one described in David S. Bolme, J. Ross Beveridge, Bruce A. Draper, Yui Man Lui, "*Visual object tracking using adaptive correlation filters*", IEEE Computer Society Conference on Computer Vision and Pattern Recognition, 2010 and mentioned here as "algorithm 5"). At the beginning, each tracker is active but invisible. Every time the location of the PoI according to the preceding algorithms coincides with that of the tracker, the confidence is increased, until the tracker becomes visible when a certain threshold is exceeded. In the case of non-coincidence, the reverse occurs until elimination of the tracker if the confidence drops below a certain threshold. At this point a new tracker will be created subsequently when a new identification of the PoI occurs (if it occurs).

The combination of the modules described so far allows the transfer of augmented reality annotations from a single model image to a sequence of destination images or to an entire destination video flow. The modules described so far can be executed in different modes: in sequence, in parallel, etc. An example of execution on calculator of the modules described so far is illustrated in FIG. 8.

Figure 8:
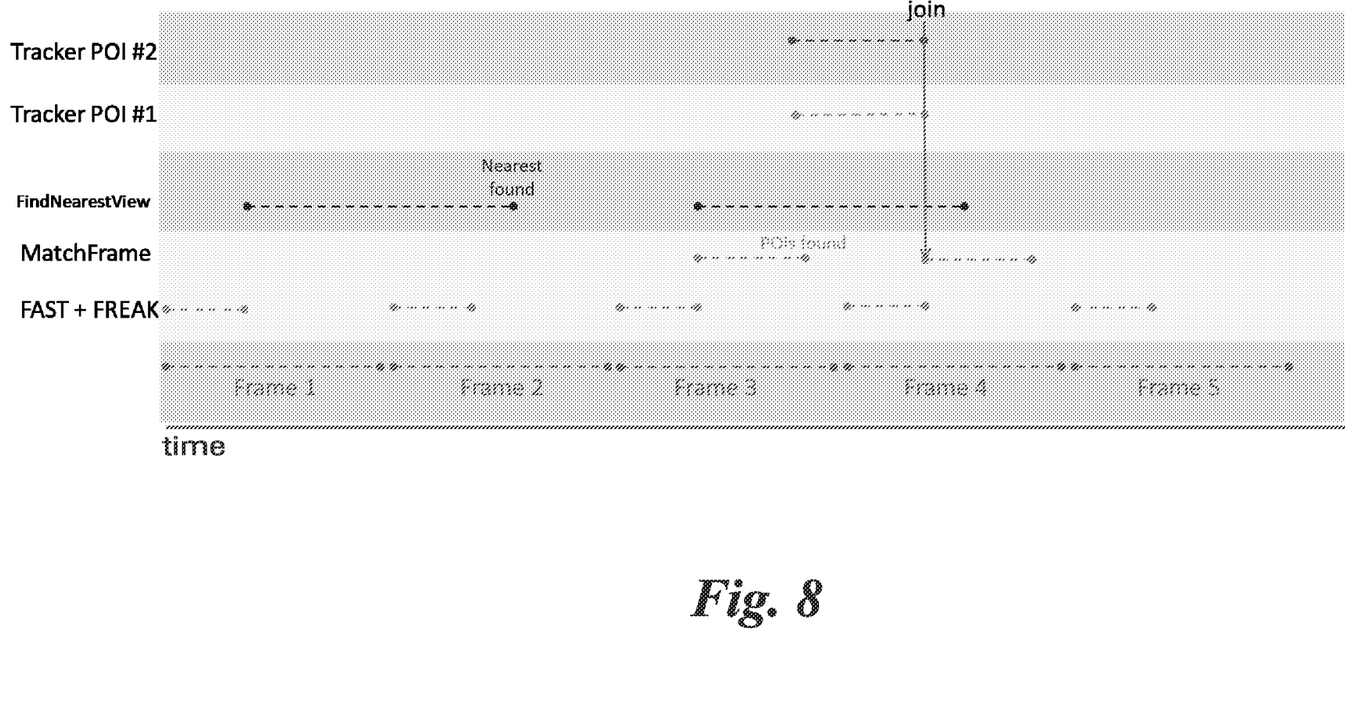
FIG. 8 shows an execution example of the method on a mobile device, in which independent threads correspond to each line.

For example, in concurrent mode (as shown in FIG. 8), for each new frame, calculation of the keypoints and the descriptors is performed by means of the known algorithms FAST (algorithm 1) and FREAK (algorithm 3). A second thread ("FindNearestView") searches for the most similar detection model based on the model detector module, while a third thread ("MatchFrame") searches for the most similar detection model up to that moment in the current image based on the PoI detector module. Lastly, every time a new PoI is detected, a tracking thread is generated for each PoI.

The method for implementing augmented reality according to the present invention thus achieves the objects previously highlighted.

The method for implementing augmented reality according to the present invention thus conceived is subject in any case to numerous modifications and variations, all falling within the same inventive concept; furthermore, all the details can be replaced by technically equivalent elements. The protective scope of the invention is therefore defined by the attached claims.

The invention claimed is:

1. A method for implementing augmented reality by transferring points of interest (PoI) from one or more model images to a destination image, the method comprising the step of creating a detection model starting from the one or more model images on which at least one point of interest (PoI) is represented, wherein said step of creating a detection model comprises the sub-steps of, for each model image of the one or more model images:

extracting a predefined group of keypoints (P1, Pn) from said model image;

calculating a descriptor for each of the keypoints (P1, Pn) of said predefined group of keypoints (P1, Pn) extracted from said specific model image;

for each point of interest (PoI), selecting a predefined subgroup of keypoints (P1, Pk) adjacent in spatial terms and selecting all the pairs (P1, P2) of said predefined subgroup of keypoints (P1, Pk) such that the following spatial relationships are valid:

the distance (P1-P2) between a first keypoint (P1) and a second keypoint (P2) exceeds a first minimum threshold, and the ratio between the distance (P1-PoI) between a first keypoint (P1) and the point of interest (PoI) and the distance (P1-P2) between a first keypoint (P1) and a second keypoint (P2) is less than a second minimum threshold;

calculating the angle value (P2, P1, PoI), measured at the vertex formed by the first keypoint (P1), between the segment joining the second keypoint (P2) and the first keypoint (P1) and the segment that joins the point of interest (PoI) and the first keypoint (P1);

the method comprising the further steps of:

identifying a specific model image of said detection model in said at least one destination image on the basis of the value of the distance, measured on the basis of said keypoint descriptors, between each keypoint (P1, Pn) of said at least one destination image and the nearest keypoint (P1, Pn) of said specific model image;

once said specific model image has been identified, transferring said at least one point of interest (PoI) of said specific model image to said at least one destination image such that for each pair of keypoints (P1', P2') of said at least one destination image, which corresponds to a pair of similar keypoints (P1, P2) of said model image, a continuous probability distribution is made to identify the position of said at least one point of interest (PoI) on said at least one destination image through the values of said angle (P2, P1, PoI) and of said ratio between the distance (P1-PoI) between the first keypoint (P1) and the point of interest (PoI) and the distance (P1-P2) between the first keypoint (P1) and the second keypoint (P2), wherein the argmax of the combination of said probability distributions identifies the position of said at least one point of interest (PoI) on said at least one destination image;

once the position of said at least one point of interest (PoI) has been identified on said at least one destination image, starting a tracker of points of interest (PoI) that tracks the position of said point of interest on subsequent destination images.

2. The method according to claim 1, wherein said combination of said probability distributions takes place according to the formula:

$$\operatorname*{argmax}_{x} \prod N(X_k, \sigma)$$

wherein each single probability distribution is represented by a Gaussian distribution centered at the point X_k identified by the values of said angle (P2, P1, PoI), of said ratio between the distance (P1-PoI) and of the variance σ.

3. The method according to claim 1, wherein said step of creating a detection model comprises a step of generating, for each model image, two further copies of the same model image with different scales, preferably a smaller model image, with scale 1/√2, and a larger model image, with scale √2.

4. The method according to claim 1, wherein said step of extracting a predefined group of keypoints (P1, Pn) from each model image comprises the steps of:

extracting a first predefined group of keypoints (P1, Pn) using a standard algorithm, maintaining a second predefined group of keypoints (P1, Pn), smaller than said first predefined group of keypoints (P1, Pn) and capable of surviving a first cleaning phase, wherein in said first cleaning phase the model image undergoes various perspective transformations and only those keypoints (P1, Pn) survive which are again detected by said standard algorithm in the same position.

5. The method according to claim 4, wherein after said descriptor calculation step the keypoints (P1, Pn) undergo a second cleaning phase, in which the model image undergoes various perspective transformations again and only those keypoints survive (P1, Pn) whereby the nearest keypoint, in terms of distances measured by descriptors, is itself transformed perspectively and vice versa, wherein each keypoint that also survives this second cleaning phase is associated with a discriminativity value, which measures the uniqueness of the descriptor of the keypoint within the entire group of model images that are intended to be recognized.

6. The method according to claim 5, wherein the value of the distance between each keypoint (P1, Pn) of said at least one destination image and the keypoint (P1, Pn) closest to said model image is multiplied by said discriminativity value, said value of the multiplied distance being accumulated in a histogram of votes wherein each bin of the histogram represents a model/view and wherein the histograms of several consecutive destination images are aggregated with an exponential moving average:

viewHistoAgg(i, t)=viewHisto (i, t)*alpha+viewHistoAgg(i, t-1)*(1-alpha)

and wherein if the ratio between the first most voted view and the second most voted view exceeds a certain threshold (ratio test), the detection model corresponding to said first view is considered as identified in the current destination image.

* * * * *